(12) United States Patent
Brouillet (10) Patent No.: US 10,918,989 B2
(45) Date of Patent: Feb. 16, 2021

(54) AIR-OIL SEPARATOR WITH TWO FLOW PATHS

(71) Applicant: PRATT & WHITNEY CANADA CORP., Longueuil (CA)

(72) Inventor: Sylvain Brouillet, St-Basile-le-Grand (CA)

(73) Assignee: PRATT & WHITNEY CANADA CORP.

(*) Notice: Subject to any disclaimer, the term of this patent is extended or adjusted under 35 U.S.C. 154(b) by 220 days.

(21) Appl. No.: 15/949,241

(22) Filed: Apr. 10, 2018

(65) Prior Publication Data

US 2019/0308129 A1 Oct. 10, 2019

(51) Int. Cl.
*B01D 45/00* (2006.01)
*B01D 50/00* (2006.01)
(Continued)

(52) U.S. Cl.
CPC .......... *B01D 50/002* (2013.01); *B01D 45/14* (2013.01); *B01D 46/0024* (2013.01); *B01D 46/0031* (2013.01); *B01D 46/0056* (2013.01); *F02C 7/06* (2013.01); *F02C 7/36* (2013.01); *B01D 2267/40* (2013.01); *B01D 2275/40* (2013.01); *F01D 25/18* (2013.01); *F01M 13/04* (2013.01); *F01M 2013/0422* (2013.01); *F02C 7/32* (2013.01); *F05D 2220/32* (2013.01); *F05D 2240/50* (2013.01); *F05D 2300/514* (2013.01)

(58) Field of Classification Search
CPC .............. B01D 50/002; B01D 46/0024; B01D 46/0056; B01D 46/0031; B01D 45/14; B01D 2275/202; B01D 2275/40; B01D 2267/40; F02C 7/06; F02C 7/32; F05D 2260/609; F05D 2240/50; F05D 2300/514; F01D 25/18; F01M 2013/0422; F01M 13/04

See application file for complete search history.

(56) References Cited

U.S. PATENT DOCUMENTS 3,561,195 A * 2/1971 Bouru ............... B01D 45/14
55/409
4,049,401 A * 9/1977 Smith ............... B01D 45/14
55/401

(Continued)

FOREIGN PATENT DOCUMENTS

GB 2494193 A 3/2013

*Primary Examiner* — Dung H Bui
(74) *Attorney, Agent, or Firm* — Norton Rose Fulbright Canada LLP (57) ABSTRACT

There is disclosed an air-oil separator for a gas turbine engine. The separator has a first separator section having a first separator rotatably mounted about a rotation axis and having an air-oil mixture inlet and an air-oil mixture outlet; a second separator section having a second separator rotatable about the rotation axis, the second separator having a first air-oil mixture inlet fluidly connected to the air-oil mixture outlet of the first separator, and a second air-oil mixture inlet; and an air outlet. A first flow path extends from the first air-oil mixture inlet to the air outlet through the two separator sections, and a second flow path extends from the second air-oil mixture inlet to the air outlet, solely through the second separator section A method of operating an air-oil separator is also disclosed.

20 Claims, 5 Drawing Sheets

(51) Int. Cl.
  F02C 7/06 (2006.01)
  F02C 7/36 (2006.01)
  B01D 45/14 (2006.01)
  B01D 46/00 (2006.01)
  *F01D 25/18* (2006.01)
  *F02C 7/32* (2006.01)
  *F01M 13/04* (2006.01)

(56) References Cited

U.S. PATENT DOCUMENTS

| | | | |
|---|---|---|---|
| 4,511,016 A | 4/1985 | Doell | |
| 4,714,139 A | 12/1987 | Lorenz et al. | |
| 5,114,446 A * | 5/1992 | Giersdorf | F01D 25/18 55/345 |
| 5,776,229 A * | 7/1998 | Blanes | B01D 45/14 55/407 |
| 6,033,450 A | 3/2000 | Krul et al. | |
| 6,398,833 B1 * | 6/2002 | Santerre | B01D 45/12 55/409 |
| 6,858,056 B2 * | 2/2005 | Kwan | B01D 45/14 55/400 |
| 7,063,734 B2 * | 6/2006 | Latulipe | B01D 50/002 55/337 |
| 8,337,581 B2 * | 12/2012 | Dejaune | B01D 45/14 55/385.1 |
| 8,657,931 B2 * | 2/2014 | Short | F01M 13/04 55/408 |
| 8,696,779 B2 * | 4/2014 | Belmonte | F01D 25/18 55/406 |
| 8,794,222 B2 * | 8/2014 | Schwandt | F01M 13/04 123/573 |
| 8,945,284 B2 * | 2/2015 | Short | F01D 25/183 95/270 |
| 9,028,576 B2 * | 5/2015 | Slayter | F02C 6/00 55/405 |
| 2013/0112029 A1 * | 5/2013 | Slayter | F02C 7/32 74/467 |

* cited by examiner

AIR-OIL SEPARATOR WITH TWO FLOW PATHS

TECHNICAL FIELD

The application relates generally to gas turbine engines and, more particularly, to systems and methods used for separating air from oil of an air-oil mixture.

BACKGROUND OF THE ART

A gas turbine engine typically includes a lubrication system for circulating a lubricant to bearing cavities and gearbox cavities, which, respectively, contains bearing and gears. For sealing such cavities, pressurized air leaked from the compressor is often used. A portion of the leaked pressurized air enters the cavities and, as a result of its passage in such cavities, is mixed with the lubricant and becomes an air-oil mixture. It is often desirable to remove the lubricant from such a mixture before expelling the air back to the atmosphere. Air-oil separators are commonly used for this purpose. However, typical air-oil separators require combining the different air-oil mixtures in a single mixture. This might impair performance. Hence, improvements are possible.

SUMMARY

In one aspect, there is provided an air-oil separator for a gas turbine engine, comprising: a first separator section having a first separator rotatably mounted about a rotation axis and having an air-oil mixture inlet and an air-oil mixture outlet, the first separator configured to receive an air oil mixture having a first oil concentration; a second separator section having a second separator rotatable about the rotation axis, the second separator having a first air-oil mixture inlet fluidly connected to the air-oil mixture outlet of the first separator, and a second air-oil mixture inlet, the second separator configured to receive an air-oil mixture having a second oil concentration, the second oil concentration less than the first oil concentration; and an air outlet, a first flow path extending from the first air-oil mixture inlet to the air outlet through the two separator sections, and a second flow path extending from the second air-oil mixture inlet to the air outlet, solely through the second separator section.

In another aspect, there is provided a gas turbine engine, comprising: at least one bearing enclosed within a housing defining a bearing cavity therein; a gearbox located within a gearbox housing defining a gearbox cavity; and an air-oil separator in driving engagement with a rotating component of the gas turbine engine for rotation about a rotation axis, the air-oil separator including a first air-oil mixture inlet fluidly connected to the bearing cavity and a second air-oil mixture inlet fluidly connected to the gearbox cavity, an air outlet fluidly connected to both of the first and second air-oil mixture inlets, the air-oil separator having a first separator section and a second separator section fluidly connected to the first separator section, a first flow path circulating from the first air-oil mixture inlet to the air outlet via the two separator sections, the air-oil separator defining a second flow path extending from the second air-oil mixture inlet to the air outlet solely via the first separator section and bypassing the second separator section.

In yet another aspect, there is provided a method of operating an air-oil separator, comprising: receiving a first air-oil mixture and a second air-oil mixture, the first air-oil mixture having a lubricant concentration more than that of the second air-oil mixture; circulating the first air-oil mixture through two separator sections; and circulating the second air-oil mixture through only one of the two separator sections and directing the second air-oil mixture such that the second air-oil mixture bypasses the other of the two separator sections.

DESCRIPTION OF THE DRAWINGS

Reference is now made to the accompanying figures in which:

FIG. 2b is a schematic cross-sectional view of the air-oil separator of FIG. 2a, but showing a different cross-section than FIG. 2a;

FIG. 3b is a schematic cross-sectional view of the air-oil separator of FIG. 3a, but showing a different cross-section than FIG. 3a;

FIG. 4b is a schematic cross-sectional view of the air-oil separator of FIG. 4a, but showing a different cross-section than FIG. 4a;

FIG. 5b is a schematic cross-sectional view of the air-oil separator of FIG. 5a, but showing a different cross-section than FIG. 5a;

DETAILED DESCRIPTION

Figure 1:
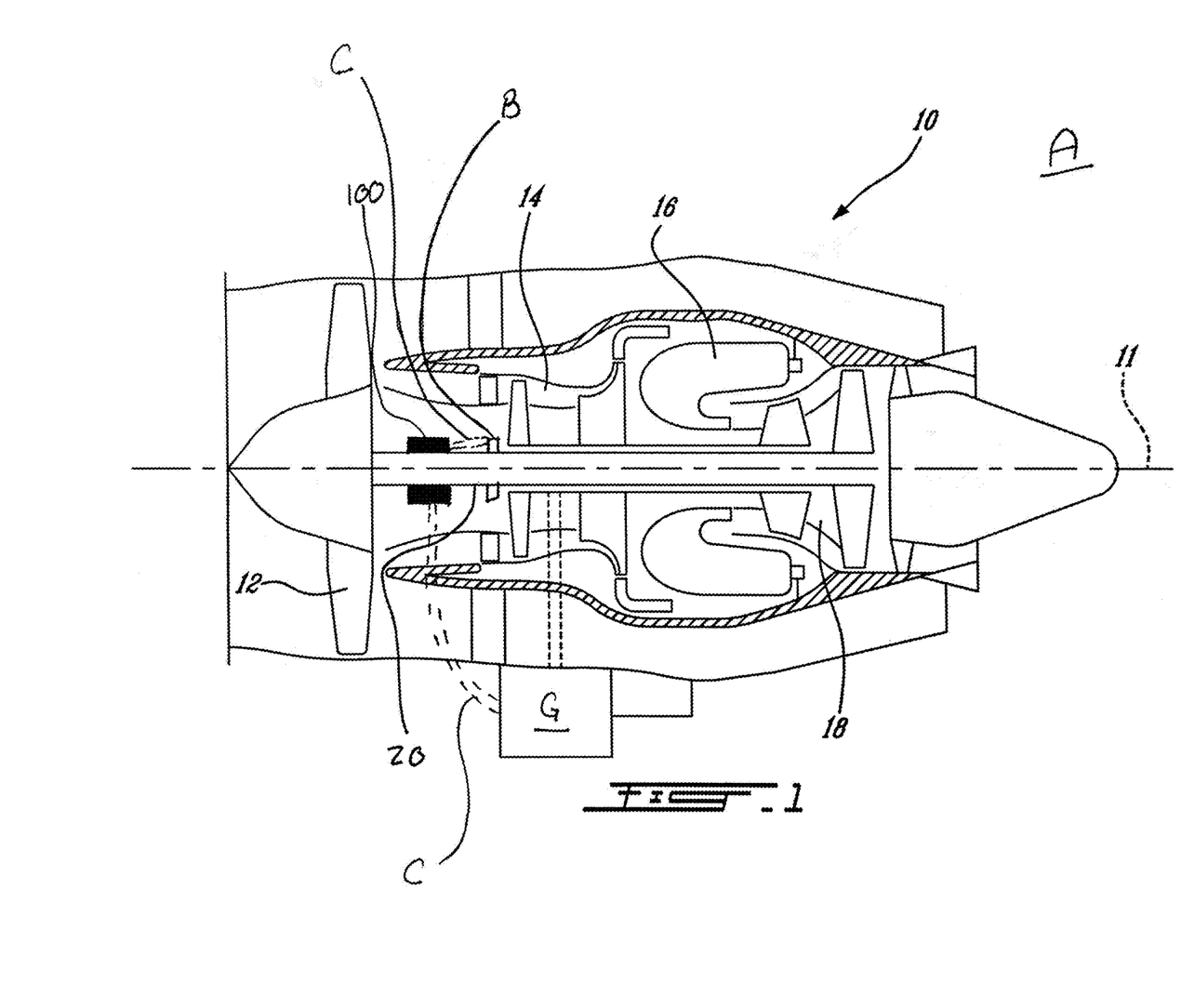
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12, compressor section 14, and turbine section 18 rotate on a shaft 20 about a rotational axis 11 of the gas turbine engine 10. As shown, an air-oil separator 100 is mounted on the shaft for integral rotation therewith. The air-oil separator 100 is used for separating an air-oil mixture that comes from either a bearing cavity B or a gearbox cavity G. More specifically, the bearing and/or gearbox cavity B, G is sealed using pressurized air from the compressor section 14. The compressed air flows within the cavity B, G thereby increasing its lubricant content. When the pressurized air exits the cavity, it is no longer only air, but an air-oil mixture. As there is no use for such a mixture, it has to be expelled. But, from an environmental perspective, it is not desirable to expel lubricant within an atmosphere A surrounding the gas turbine engine 10. Therefore, the air-oil mixture passes through the air-oil separator 100 in which the lubricant of the air-oil mixture is at least partially removed and scavenged. The scavenged lubricant may be reused.

However, the leaked pressurized air that exits the bearing cavity B has a lubricant concentration less than that of the leaked pressurized air that exits the gearbox cavity G. Typically, both air-oil mixtures are combined together and conjointly circulated in an air-oil separator. A lubricant concentration of the air-oil mixture from the bearing cavity B increases as a result of this mixing with the air-oil mixture from the gearbox cavity G.

In the embodiment shown, the air-oil separator 100 has two air-oil mixture inlets each fluidly connected to a respective one of the bearing cavity B and the gearbox cavity G via suitable conduits C. Different embodiments of air-oil separators are described herein below.

Figure 2A:
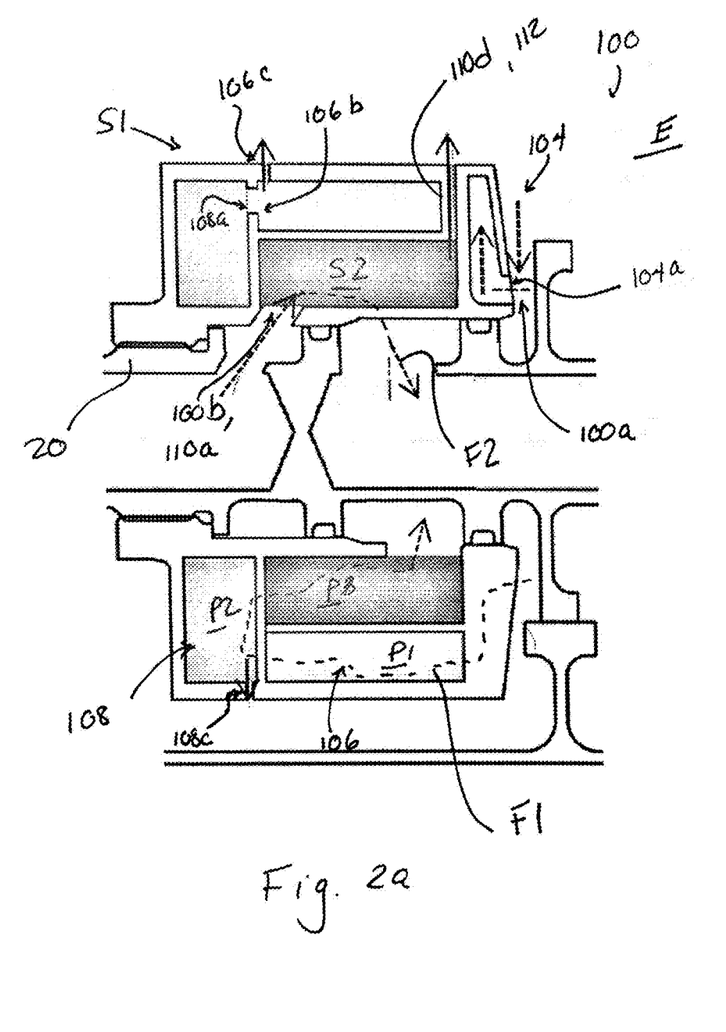
FIG. 2a is a schematic cross-sectional view of an air-oil separator in accordance with one embodiment.
Figure 2B:
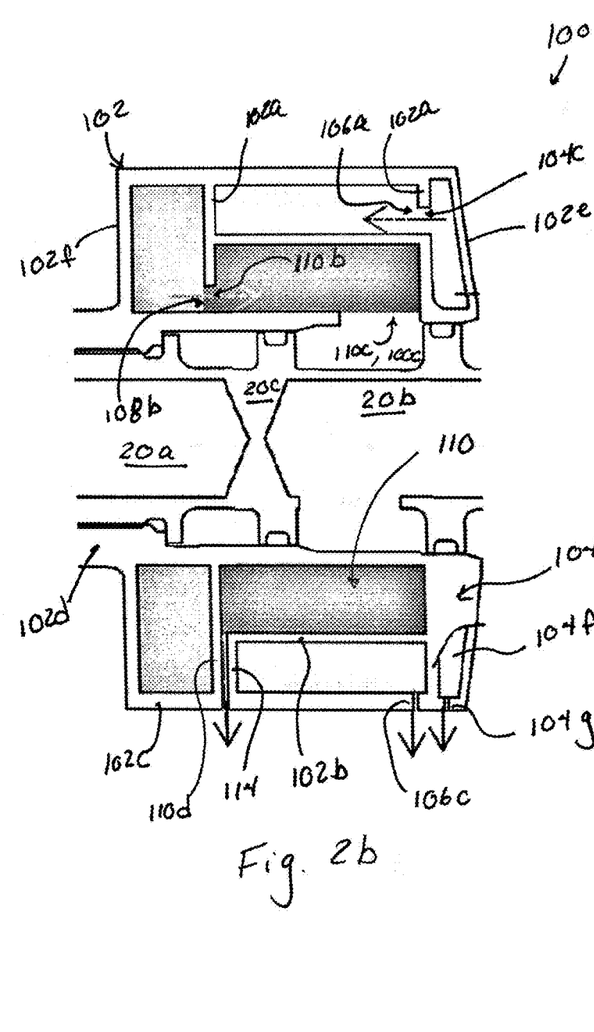

Referring now to FIGS. 2a and 2b, the air-oil separator 100 is illustrated in greater detail. The air-oil separator 100 includes a casing 102 and two separator sections S1, S2 within the casing 102. The two separator sections S1, S2 are in serial flow communication. In the embodiment shown, the two separator sections S1, S2 includes a first section S1 and a second section S2 downstream of the first section S1 relative to a flow of an air-oil mixture circulating therein.

The first section S1 includes at least one separator, a first 104, a second 106, and a third 108 separator in the depicted embodiment, and the second section includes at least one separator, a fourth separator 110 in the embodiment shown. In the embodiment shown, the second 106 and fourth 110 separators are located axially between the first 104 and third 108 separators relative to the rotation axis 11. The second separator 106 is disposed radially outwardly to the fourth separator 110. In other words, the second and fourth 106, 110 separators axially overlap each other relative to the rotation axis 11.

It is understood that each separator sections may each comprise one or more than one separator depending of a lubricant concentration of the air-oil mixture received therein. These separators may be matrix separators or bladed separators depending of the lubricant concentration.

Each of the first, second, third, and fourth separators 104, 106, 108, 110 are located within the casing 102. The casing 102 has two radial interior walls 102a and a circumferential interior wall 102b. The two radial interior walls 102a are axially spaced apart from each other relative to the rotation axis 11. The circumferential interior wall 102b extends from one of the two radial interior walls 102a to the other of the two radial interior walls 102a. The circumferential interior wall 102b is located radially between an outer circumferential wall 102c and an inner circumferential wall 102d of the casing 102. The casing 102 further has a fore radial wall 102e and an aft radial wall 102f axially spaced apart from the fore radial wall 102e relative to the rotation axis 11. The two radial interior walls 102a are between the fore and aft walls 102e, 102f. Each of the above described walls extends circumferentially around the rotation axis 11.

In the depicted embodiment, the air-oil separator 100 has a first air-oil mixture inlet 100a that corresponds to an air-oil mixture inlet 104a of the first separator 104, and a second air-oil mixture inlet 100b that corresponds to an air-oil mixture inlet 110a of the fourth separator 110. The air-oil separator first air-oil mixture inlet 100a is configured for receiving a first air-oil mixture having a first lubricant concentration from the gearbox cavity G (FIG. 1) of the gas turbine engine 10. The air-oil separator second air-oil mixture inlet 100b is configured for receiving a second air-oil mixture having a second lubricant concentration, which is less than the first lubricant concentration, from the bearing cavity B (FIG. 1). It is understood that a location of the second air-oil mixture inlet 100b of the air oil-separator 100 may be different depending of a lubricant concentration of the second-air oil mixture.

A fineness of the separators 104, 106, 108, 110 increases in a downstream direction. Stated otherwise, the fourth separator 110 is finer than the third separator 108, which is finer than the second separator 106, which is finer than the first separator 104. A fineness of a separator corresponds to dimensions or spaces configured for receiving therein the air-oil mixture. In a bladed-type separator, the fineness may be dimensions of spaces between two adjacent ones of blades and, in a matrix separator, the fineness may be dimensions of spaces, or micro passages, defined by a porous media contained therein. A finer separator is able to cater to an air-oil mixture having a lubricant concentration that is lower than a lubricant concentration a coarser separator is configured to catered to. In the present specification and claims, "configured to cater to" means that the separator is tailored, or tuned, to separate oil from an air-oil mixture characterized by a specific range of oil concentrations.

The first separator 104 is located axially between the casing fore radial wall 102e and a forward one of the two casing radial interior walls 102a and radially between the inner and outer circumferential walls 102d, 102c of the casing 102. As illustrated, the first separator air-oil mixture inlet 104a corresponds to at least one aperture extending through the casing fore radial wall 102e and an air-oil mixture outlet 104c that, as shown, corresponds to at least one aperture extending through the forward one of the two casing radial interior walls 102a.

In the embodiment shown, the first separator 104 is a bladed separator that includes a rotor 104e configured for rotation about the rotation axis 11. The rotor has blades 104f circumferentially distributed therearound. In operation, the rotor blades 104f impact lubricant droplets contained within the air-oil mixture. Once impacted, the droplets move along the blades 104f in a radially outward direction, away from the rotation axis 11, via centrifugal force.

The lubricant is expelled to an environment E outside the air-oil separator 100 via an oil outlet 104g defined by the casing 102. In the embodiment shown, the oil outlet 104g corresponds to at least one aperture defined through the outer circumferential wall 102c of the casing 102. The at last one aperture may include a plurality of apertures circumferentially distributed around the rotation axis. Number and size of the apertures is tuned in function of a lubricant content of the air-oil mixture circulating within the first separator.

The second separator 106 is located axially between the two casing radial interior walls 102a and radially between the casing circumferential interior wall 102b and the casing circumferential outer wall 102c. The second separator 106 has an air-oil mixture inlet 106a that corresponds to the first separator air-oil mixture outlet 104c. The second separator 106 has an air-oil mixture outlet 106b that, in the embodiment shown, corresponds to at least one aperture extending through a rearward one of the two casing radial interior walls 102a. The lubricant is expelled to the environment E outside the air-oil separator 100 via an oil outlet 106c defined by the casing 102. In the embodiment shown, the oil outlet 106c corresponds to at least one aperture defined through the outer circumferential wall 102c of the casing 102. The at last one aperture may include a plurality of apertures circumferentially distributed around the rotation axis. As shown, the oil outlet 106c includes apertures proximate both of the casing radial interior walls 102a.

The third separator 108 is located axially between the rearward one of the two casing radial interior walls 102a and the casing aft radial wall 102f and radially between the casing inner and outer circumferential walls 102d, 102c. The third separator 108 has an air-oil mixture inlet 108a that corresponds to the air-oil mixture outlet 106b of the second separator 106. The third separator 108 has an air-oil mixture outlet 108b that, in the embodiment shown, corresponds to at least one aperture defined through the rearward one of the two casing radial interior walls 102a. The third separator air-oil inlet 108a is radially offset from the third separator air-oil outlet 108b. The lubricant is expelled to the environment E outside the air-oil separator 100 via an oil outlet 108c defined by the casing 102. In the embodiment shown, the third separator oil outlet 108c corresponds to at least one aperture defined through the outer circumferential wall 102c of the casing 102. The at last one aperture may include a plurality of apertures circumferentially distributed around the rotation axis 11.

The fourth separator 110 is located radially inwardly to the second separator 106 and is located axially between the two casing radial interior walls 102a and radially between the casing inner circumferential wall 102b and the casing circumferential interior wall 102d. The fourth separator 110 has two air-oil mixture inlets 110a, 110b. One of the two air-oil mixture inlets 110b corresponds to the air-oil mixture outlet 108b of the third separator 108. The other of the two air-oil mixture inlets 110a corresponds to the second air-oil mixture inlet 100b of the air-oil separator 100.

In the embodiment shown, the second air-oil mixture inlet 100b of the air-oil separator 100 corresponds to at least one aperture extending through the casing inner circumferential wall 102d. As shown, the second air-oil mixture circulates within a first air conduit 20a defined by the engine shaft 20, which is hollow. At least one aperture extends through the engine shaft 20 such that the second air-oil mixture inlet 100b of the air-oil separator 100 is fluidly connected to the bearing cavity B (FIG. 1) via the first air conduit 20a of the engine shaft 20 and via both of the at least one aperture extending through the engine shaft 20 and via the at least one aperture extending through the casing inner circumferential wall 102d.

The fourth separator 110 has an air outlet 110c which corresponds to an air outlet 100c of the air-oil separator 100. The air outlet 100c is fluidly connected to the atmosphere A (FIG. 1) outside the gas turbine engine 10. In the embodiment shown, the shaft 20 includes a second air conduit 20b. The second air conduit 20b is fluidly connected to the air outlet 100c via at least one aperture defined through the engine shaft 20. In other words, the air outlet 100c is fluidly connected to the atmosphere A via the second air conduit 20b, via the at least one aperture of the casing inner circumferential wall 102d, and via the at least one aperture of the engine shaft 20.

The engine shaft 20 includes a section 20c for fluidly disconnecting the first air conduit 20a from the second air conduit 20b. Suitable sealing means are provided between the shaft section 20c and the casing inner circumferential wall 102d for limiting fluid flow communication between the first and second air conduits 20a, 20b of the engine shaft 20.

The fourth separator 110 has an oil outlet 110d. In the embodiment shown, the oil outlet 110d of the fourth separator 110 corresponds to at least one passage 112 defined through the second separator 106. The at least one passage 112 is defined by at least one hollow strut 114 that extends radially from the casing circumferential interior wall 102b to the casing outer circumferential wall 102c and through the second separator 104. In the depicted embodiment, the at least one hollow strut 114 includes a plurality of hollow struts circumferentially distributed around the rotation axis 11. The hollow struts 114 are located adjacent both of the two casing radial interior walls 102a.

The at least one fluid passage 112 is fluidly connected to at least one aperture defined through the casing outer circumferential wall 102c. Therefore, the environment E outside the air-oil separator 100 is fluidly connected to the fourth separator 110 via the fluid passages 112 of the plurality of hollow struts 114, and via the apertures defined through the casing outer circumferential wall 102c.

In the embodiment shown, the second, third, and fourth separators 106, 108, 110 are matrix separators. Each of which includes a porous media P1, P2, P3 that may be provided in a form of a disk circumferentially extending around the rotation axis 11. Such media may be, for instance, a sponge or a mesh material, defining a plurality of intricate micro passages that are in fluid communication with one another. In such a porous media a flow path circulating therethrough would be tortuous as it moves from one micro passage to another. As illustrated, the porous media P rotates integrally with both of the casing 102 and the shaft 20 of the gas turbine engine 10. The lubricant droplets of the air-oil mixture coalesce against the material of the porous media and migrate radially outwardly away from the rotation axis 11 via the centrifugal force.

A density of the porous media of the second, third, and fourth separators 104, 106, 108 increases along the downstream direction. Stated otherwise, dimensions of the micro passages of the second separator porous media P1 are greater than that of the third separator porous media P2 and dimensions of the micro passages of the third separator porous media P2 are greater than that of the fourth separator porous media P3. The greater are the micro passages, the less dense is the porous media.

The air-oil separator 100 defines two flow paths F1, F2. A first one F1 of the two flow paths extends from the air-oil mixture inlet 104a of the first separator 104 to the air outlet 110c and passes through the first, the second, the third, and the fourth separators 104, 106, 108, 110. The first one F1 of the two flow paths extends through both of the two separator sections S1, S2. A second one F2 of the two flow paths extends from the air-oil mixture inlet 110a of the fourth separator 110 to the air outlet 100c and extends solely through the fourth separator 104. The second one F2 of the two flow paths bypasses the first separator sections S1 and extends only through the second separator sections S2. In the embodiment shown, the second one F2 of the two flow paths bypasses the first, second, and third separators 104, 106, 108.

Figure 3A:
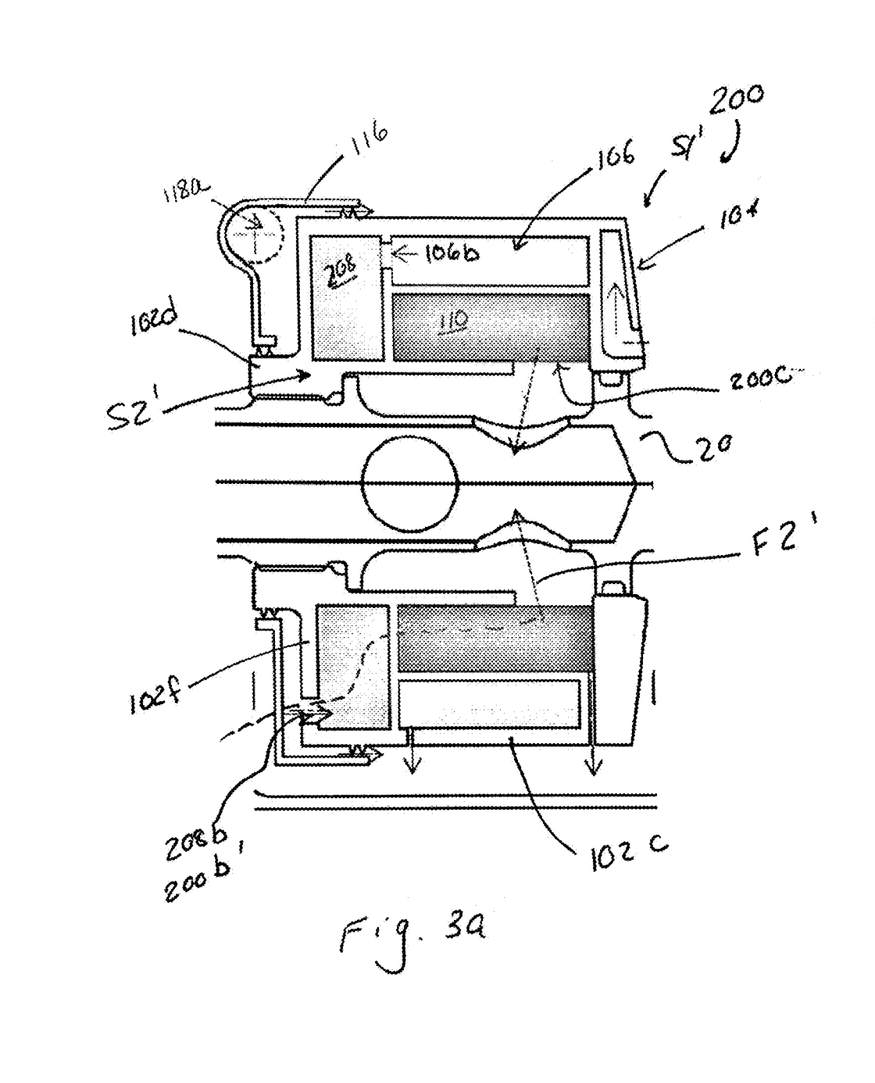
FIG. 3a is a schematic cross-sectional view of an air-oil separator in accordance with one embodiment.
Figure 3B:
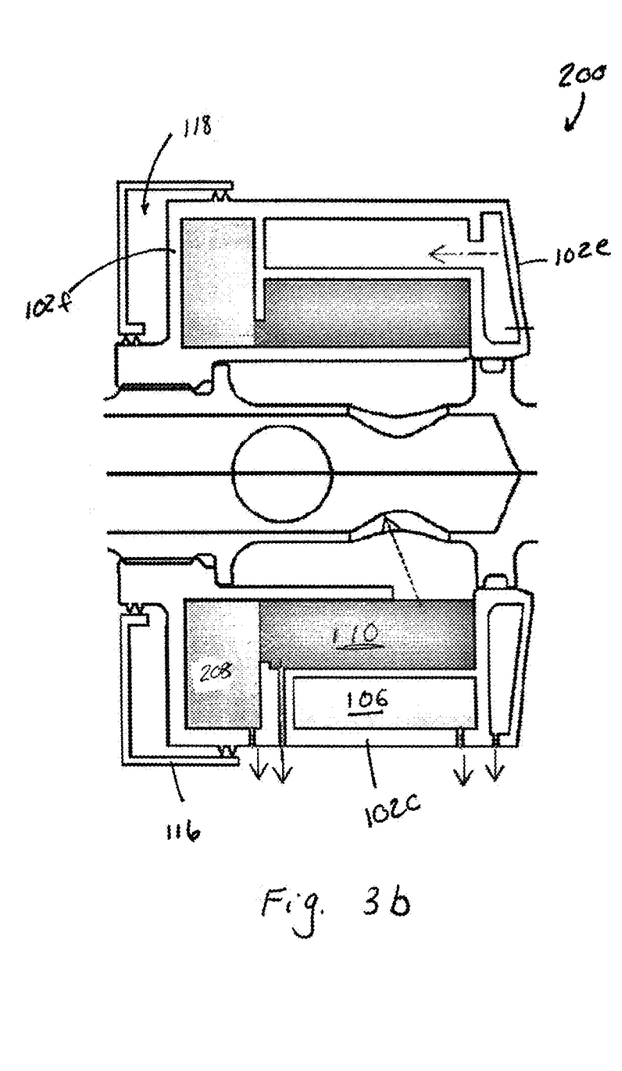

Referring now to FIGS. 3a and 3b, another embodiment of an air-oil separator is generally shown at 200. For the sake of conciseness, only elements that differ from the air-oil separator of FIGS. 2a and 2b are described herein below.

In the embodiment shown, the first section S1' includes the first and second separators 104, 106 whereas the second section S2' includes the third and fourth separators 108, 110. The second air-oil mixture comes from outside the engine shaft 20. Therefore, the air-oil separator 200 includes a secondary casing 116 that is disposed adjacent the casing aft radial wall 102f and that abuts against both the casing inner and outer circumferential walls 102d, 102c. A plenum 118 is defined between the secondary casing 116 and the casing 102. The plenum 118 is fluidly connected to the bearing cavity B (FIG. 1).

As shown, the third separator 208 has two air-oil mixture inlets 208a, 208b. One of the two air-oil mixture inlets 208a corresponds to the air-oil mixture outlet 106b of the second separator 106. The other of the two air-oil mixture inlets 208b corresponds to the second air-oil mixture inlet 200b of the air-oil separator 200. In the embodiment shown, the second air-oil mixture inlet 200b of the air-oil separator 200 corresponds to at least one aperture defined through the casing aft radial wall 102f. Hence, the bearing cavity B is fluidly connected to the third separator 208 via a plenum inlet 118a, the plenum 118, and via the other of the two air-oil mixture inlets 208b of the third separator 208.

Suitable sealing means are provided between the secondary casing 116 and the casing 102 because the casing rotates relative to the secondary casing. Any suitable means, such as contacting and non-contacting seals may be used.

In this embodiment, the second one of the two flow paths F2' extends from the air-oil mixture inlet 208b of the third separator 208 to the air outlet 200c and extends through the third and the fourth separators 208, 110. The second one of the two flow paths F2' bypasses the first separator section S1' and extends only through the second separator section S2'. In the embodiment shown, the second one of the two flow paths F2' bypasses the first and the second separators 104, 106.

Figure 4A:
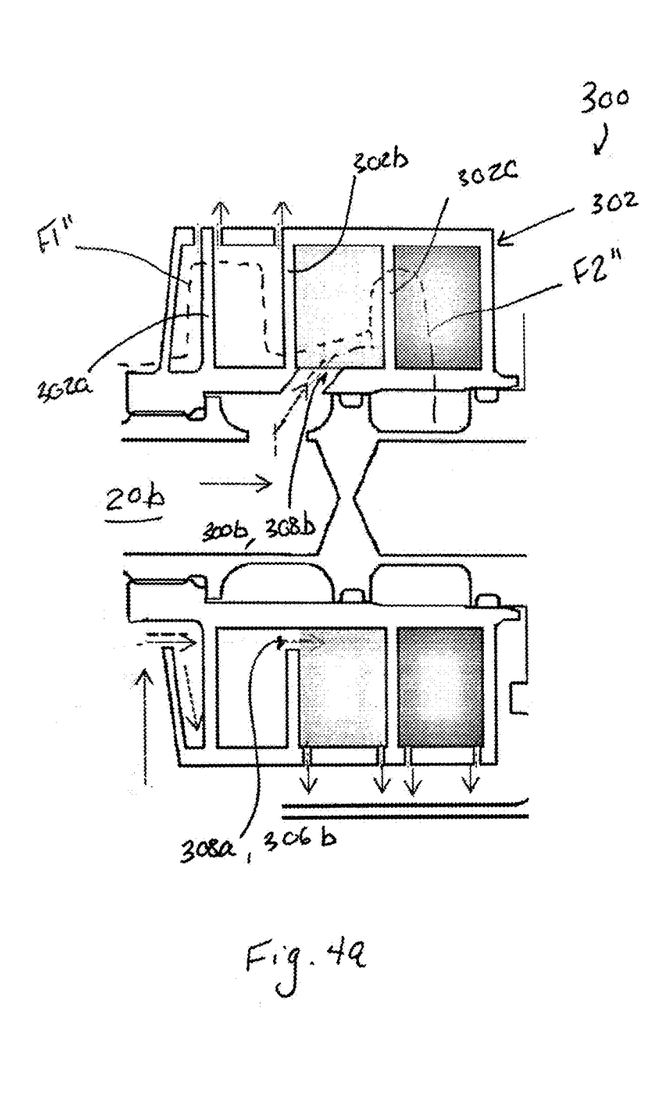
FIG. 4a is a schematic cross-sectional view of an air-oil separator in accordance with one embodiment.
Figure 4B:
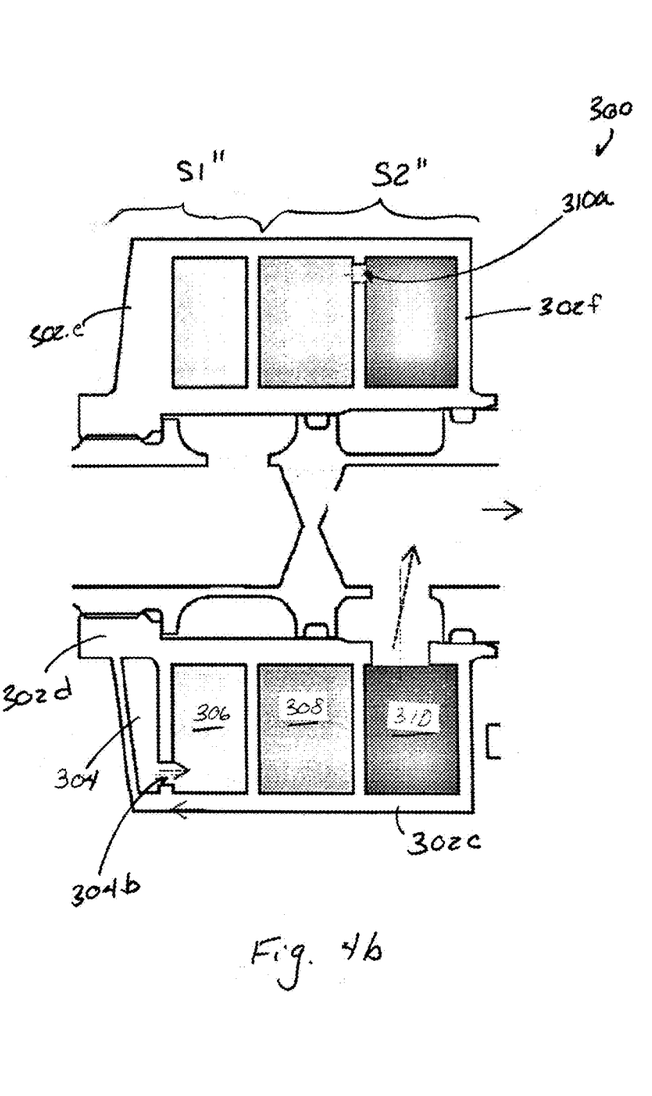

Referring now to FIGS. 4a and 4b, another embodiment of an air-oil separator is generally shown at 300. For the sake of conciseness, only elements that differ from the air-oil separator 100 of FIGS. 2a and 2b are described herein below.

The casing 302 includes first, second, and third radial interior walls 302a, 302b, 302c that are located axially between the fore and aft radial walls 302e, 302f and that extend radially from the circumferential inner wall 302d the circumferential outer wall 302c. The first radial interior wall 302a is disposed axially between the first and second separators 104, 106. The second radial interior wall 302b is disposed axially between the second and the third separator 306, 308. The third radial interior wall 302c is disposed axially between the third and fourth separator 308, 310. In this embodiment, each of the first, second, third and fourth separators 304, 306, 308, 310 are axially offset from each other. The first separator section S1" includes the first and second separators 304, 306 whereas the second separator section S2" includes the third and fourth separators 308, 310.

The air-oil mixture inlet 306a of the second separator 306 corresponds to at least one aperture defined through the first radial interior wall 302a. The air-oil mixture inlet 308a of the third separator 308 corresponds to at least one aperture defined through the second radial interior wall 302b. The air-oil mixture inlet 310a of the fourth separator 310 corresponds to at least one aperture defined through the third radial interior wall 302c.

As shown, the third separator 308 has two air-oil mixture inlets 308a, 308b. One of the two air-oil mixture inlets 308a corresponds to the air-oil mixture outlet 306b of the second separator 306. The other of the two air-oil mixture inlets 308b corresponds to the second air-oil mixture inlet 300b of the air-oil separator 300. In the embodiment shown, the second air-oil mixture inlet 300b of the air-oil separator 300 corresponds to at least one aperture defined through the casing inner circumferential wall 302d. The second air-oil mixture inlet 300b of the air-oil separator 300 is fluidly connected to the bearing cavity B (FIG. 1) via the first air conduit 20b of the engine shaft 20.

The air-oil mixture inlet 310a of the fourth separator 310 and the air-oil mixture outlet 306b of the second separator are radially offset from each other. The former is located adjacent the casing outer circumferential wall 302c whereas the latter is located adjacent the casing inner circumferential wall 302d. Such a radial offset forces the air-oil mixture circulating therein to move radially away from the rotation axis 11 and provides a distance travelled by the air-oil mixture within the third separator 308 that is greater than that of a configuration lacking such radial offset. Similarly, the air-oil mixture inlet 308a of the third separator 308 is radially offset from the air-oil mixture outlet 304b of the first separator 304.

In this embodiment, the first one F1" of the flow paths extends through all of the separators 304, 306, 308, and 310 and has a sinusoidal shape caused by the radial offsets of the different air-oil mixture inlets/outlets. The second one F2" of the two flow paths extends from the air-oil mixture inlet of the third separator to the air outlet and extends through the third and the fourth separators. The second one of the two flow paths bypasses the first separator sections and extends only through the second separator sections. In the embodiment shown, the second one of the two flow paths bypasses the first and the second separators.

Figure 5A:
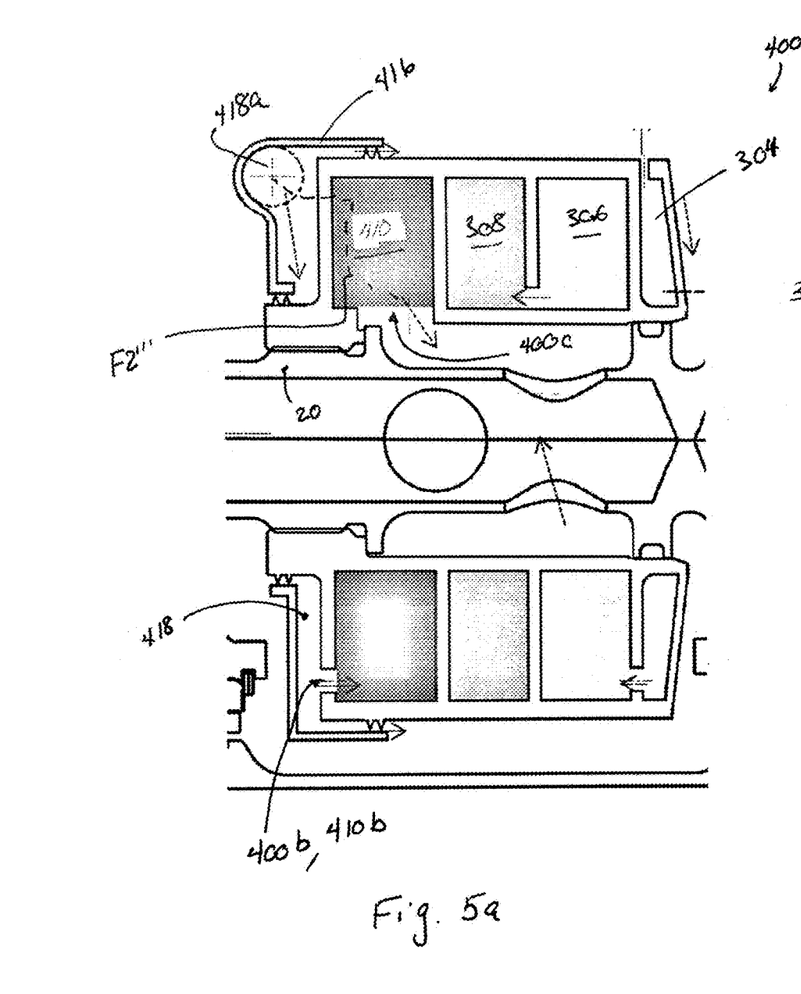
FIG. 5a is a schematic cross-sectional view of an air-oil separator in accordance with one embodiment.
Figure 5B:
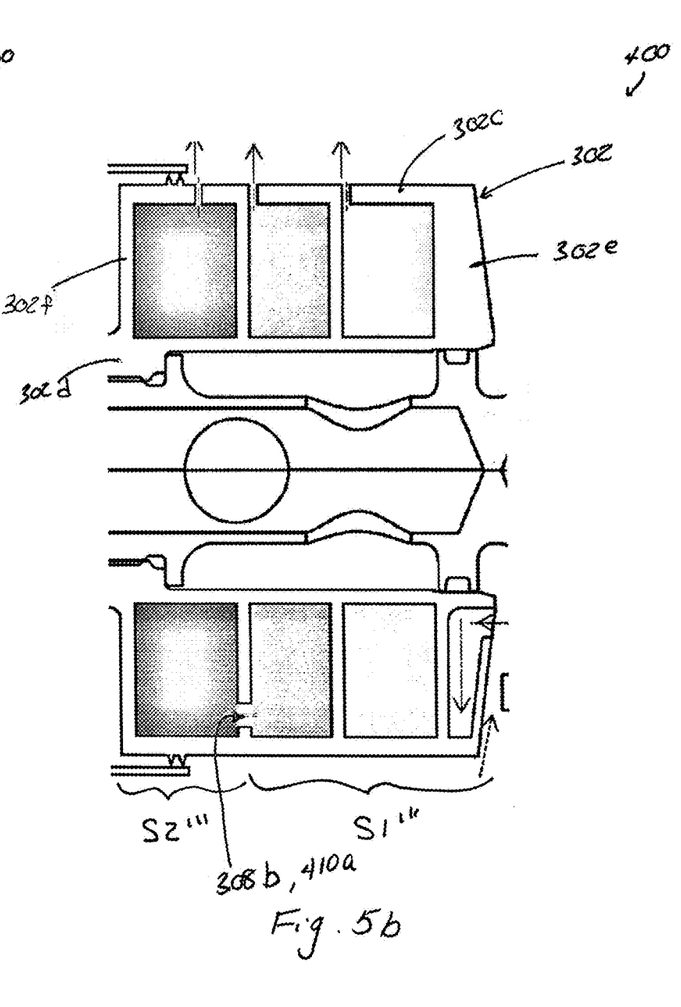

Referring now to FIGS. 5a and 5b, another embodiment of an air-oil separator is generally shown at 400. For the sake of conciseness, only elements that differ from the air-oil separator of FIGS. 4a and 4b are described herein below.

In the embodiment shown, the first section S1'" includes the first, second, and third separators 304, 306, 308 whereas the second section S1'" includes the fourth separator 410. The second air-oil mixture comes from outside the engine shaft 20. Therefore, the air-oil separator 400 includes a secondary casing 416 that is disposed adjacent the casing aft radial wall 320f and that abuts against both the casing inner and outer circumferential walls 302d, 302c. A plenum 418 is defined between the secondary casing 416 and the casing 302. The plenum 418 is fluidly connected to the bearing cavity B (FIG. 1).

As shown, the fourth separator 410 has two air-oil mixture inlets 410a, 410b. One of the two air-oil mixture inlets 410a corresponds to the air-oil mixture outlet 308b of the third separator 308. The other of the two air-oil mixture inlets 410b corresponds to the second air-oil mixture inlet 400b of the air-oil separator 400. In the embodiment shown, the second air-oil mixture inlet 400b of the air-oil separator 400 corresponds to at least one aperture defined through the casing aft radial wall 302f. Hence, the bearing cavity B is fluidly connected to the fourth separator 410 via the plenum inlet 418a, the plenum 418, and via the other of the two air-oil mixture inlets 410b of the fourth separator 410.

In this embodiment, the second one of the two flow paths F2'" extends from the air-oil mixture inlet 410b of the fourth separator 410 to the air outlet 400c and extends through the fourth separator 410. The second one of the two flow paths F2'" bypasses the first separator section S1'" and extends only through the second separator section S2'". In the embodiment shown, the second one of the two flow paths F2'" bypasses the first, second, and third separators 304, 306, 308.

Referring back to FIGS. 2a and 2b, for operating the air-oil separator 100 the first air-oil mixture and the second air-oil mixture are received. The first air-oil mixture 100 is circulated through the two separator sections S1, S2 and the second air-oil mixture is circulated through only one S2 of the two separator sections S1, S2. The second air-oil mixture is directed such that the second air-oil mixture bypasses the other S1 of the two separator sections S1, S2.

In the depicted embodiment, the two separator sections S1, S2 include the first, second, third, and fourth separators 104, 106, 108, 110. The first air-oil mixture is circulated through the first, the second, the third, and the fourth separator. The second air-oil mixture is circulated solely through the fourth separator 110.

Referring now to FIGS. 3a and 3b, the first air-oil mixture is received in the plenum 118 before the first air-oil mixture is circulated through the two separator sections S1', S2'. In this embodiment, the second air-oil mixture is circulated solely through the third and fourth separators 208, 110.

Dimensions of each of the first, second, third, and fourth separators may be tuned to the lubricant concentrations of the first and second air-oil mixtures. Numbers and sizes of the apertures that correspond to the plurality of air-oil mixture inlet/outlets, the air outlet, and the oil outlets may be tuned in function of the lubricant concentrations. Angular relation of the openings may be optimized for varying a residency time of the mixture to vary a separation effectiveness. It is understood that each of the two separator sections may include a different number of separators.

In a particular embodiment, by having two air-oil mixture inlets, each of the two air-oil mixtures may be fed to a specific location within the air-oil separator where its lubricant content will not increase as a result of being mixed with the other of the mixtures. Therefore, an efficiency of the air-oil separator may be increased compared to a configuration in which the different air-oil mixtures follow a same, common, flow path and in which the mixtures are mixed before entering the air-oil separator. A pressure variation though the air-oil separator may be less than that of the configuration that mixes the mixtures before circulating them in the separator.

The above description is meant to be exemplary only, and one skilled in the art will recognize that changes may be made to the embodiments described without departing from the scope of the invention disclosed. Till other modifications which fall within the scope of the present invention will be apparent to those skilled in the art, in light of a review of this disclosure, and such modifications are intended to fall within the appended claims.

The invention claimed is:

1. A gas turbine engine comprising an air-oil separator, the air-oil separator having:
    a first separator section having a first separator rotatably mounted about a rotation axis and having an air-oil mixture inlet and an air-oil mixture outlet, the first separator configured to receive an air oil mixture having a first oil concentration;
    a second separator section having a second separator rotatable about the rotation axis, the second separator having a first air-oil mixture inlet fluidly connected to the air-oil mixture outlet of the first separator, and a second air-oil mixture inlet, the second separator configured to receive an air-oil mixture having a second oil concentration, the second oil concentration less than the first oil concentration; and
    an air outlet, a first flow path extending from the first air-oil mixture inlet to the air outlet through the two separator sections, and a second flow path extending from the second air-oil mixture inlet to the air outlet, solely through the second separator section.

2. The gas turbine engine of claim 1, wherein the first separator section includes a bladed separator, the bladed separator having a rotor with blades, the rotor configured for rotation about a rotation axis.

3. The gas turbine engine of claim 1, wherein the second separator section includes a matrix separator, the matrix separator having a porous media, the matrix separator configured for rotation about a rotation axis.

4. The gas turbine engine of claim 1, wherein the first separator section includes, in an upstream to downstream order, a first, a second, and a third separator in serial flow communication, the second separator section including a fourth separator, the first air-oil mixture inlet located upstream of the first separator, the second air-oil mixture inlet of the second separator section located downstream of the third separator and upstream of the fourth separator, the first flow path extending through the first, second, third, and fourth separators, the second flow path solely extending through the fourth separator and bypassing the first, second, and third separators.

5. The gas turbine engine of claim 4, wherein the first, second, third, and fourth separators are axially offset from each other.

6. The gas turbine engine of claim 4, wherein the first separator is a bladed rotor configured for rotation about a rotation axis, and wherein the second, third, and fourth separators are matrix separators including each a porous media, densities of the porous media of the second, third, and fourth separators increasing in a downstream direction.

7. The gas turbine engine of claim 1, wherein the first separator section includes at least a first separator and the second separator section includes at least a second separator, the first separator disposed radially outwardly to the second separator relative to the rotation axis, the air-oil separator further including at least one passage extending radially from the second separator across the first separator for expelling oil extracted by the second separator toward an environment outside the air-oil separator.

8. The gas turbine engine of claim 1, further including a plenum defined between a secondary casing and a casing, the casing disposed around the first and second separator sections, the plenum circumferentially extending around the rotation axis, the plenum having an inlet for receiving the second air-oil mixture, the plenum fluidly connected to the second air-oil mixture inlet of the second separator section.

9. A gas turbine engine comprising an air-oil separator having: having: a first separator section having a first separator rotatably mounted about a rotation axis and having an air-oil mixture inlet and an air-oil mixture outlet; a second separator section having a second separator rotatable about the rotation axis, the second separator having a first air-oil mixture inlet fluidly connected to the air-oil mixture outlet of the first separator, and a second air-oil mixture inlet; and an air outlet, the first air-oil mixture inlet fluidly connected to the air outlet through both of the first separator section and the second separator section, and the second air-oil mixture inlet fluidly connected to the air outlet while bypassing the first separator section.

10. The gas turbine engine of claim 9, wherein the first separator section includes a bladed separator, the bladed separator having a rotor with blades, the rotor configured for rotation about a rotation axis.

11. The gas turbine engine of claim 9, wherein the second separator section includes a matrix separator, the matrix separator having a porous media, the matrix separator configured for rotation about a rotation axis.

12. The gas turbine engine of claim 9, wherein the first separator section includes, in an upstream to downstream order, a first, a second, and a third separator in serial flow communication, the second separator section including a fourth separator, the first air-oil mixture inlet located upstream of the first separator, the second air-oil mixture inlet of the second separator section located downstream of the third separator and upstream of the fourth separator, a first flow path extending through the first, second, third, and fourth separators, a second flow path solely extending through the fourth separator and bypassing the first, second, and third separators.

13. The gas turbine engine of claim 12, wherein the first, second, third, and fourth separators are axially offset from each other.

14. The gas turbine engine of claim 12, wherein the first separator is a bladed rotor configured for rotation about a rotation axis, and wherein the second, third, and fourth separators are matrix separators including each a porous media, densities of the porous media of the second, third, and fourth separators increasing in a downstream direction.

15. The gas turbine engine of claim 9, wherein the first separator section includes at least a first separator and the second separator section includes at least a second separator, the first separator disposed radially outwardly to the second separator relative to the rotation axis, the air-oil separator further including at least one passage extending radially from the second separator across the first separator for expelling oil extracted by the second separator toward an environment outside the air-oil separator.

16. A gas turbine engine comprising an air-oil separator having: a first separator section having a first separator rotatably mounted about a rotation axis and having an air-oil mixture inlet and an air-oil mixture outlet; a second separator section having a second separator rotatable about the rotation axis, the second separator having a first air-oil mixture inlet fluidly connected to the air-oil mixture outlet of the first separator, and a second air-oil mixture inlet; and an air outlet, the first air-oil mixture inlet fluidly connected to the air outlet through both of the first separator section and the second separator section, and the second air-oil mixture inlet fluidly connected to the air outlet and fluidly disconnected from the first separator section.

17. The gas turbine engine of claim 16, wherein the first separator section includes a bladed separator, the bladed separator having a rotor with blades, the rotor configured for rotation about a rotation axis.

18. The gas turbine engine of claim 16, wherein the second separator section includes a matrix separator, the matrix separator having a porous media, the matrix separator configured for rotation about a rotation axis.

19. The gas turbine engine of claim 16, wherein the first separator section includes, in an upstream to downstream order, a first, a second, and a third separator in serial flow communication, the second separator section including a fourth separator, the first air-oil mixture inlet located upstream of the first separator, the second air-oil mixture inlet of the second separator section located downstream of the third separator and upstream of the fourth separator, a first flow path extending through the first, second, third, and fourth separators, a second flow path solely extending through the fourth separator and bypassing the first, second, and third separators.

20. The gas turbine engine of claim 16, wherein the first separator section includes at least a first separator and the second separator section includes at least a second separator, the first separator disposed radially outwardly to the second separator relative to the rotation axis, the air-oil separator further including at least one passage extending radially from the second separator across the first separator for expelling oil extracted by the second separator toward an environment outside the air-oil separator.

\* \* \* \* \*